US008850028B2

(12) United States Patent
Moritzen

(10) Patent No.: US 8,850,028 B2
(45) Date of Patent: Sep. 30, 2014

(54) METHOD AND APPARATUS FOR MONITORING THE TRANSMISSION OF MEDICAL DATA IN A COMMUNICATION NETWORK

(75) Inventor: Klaus Moritzen, Moehrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 1877 days.

(21) Appl. No.: 11/121,043

(22) Filed: May 4, 2005

(65) Prior Publication Data
US 2005/0262200 A1 Nov. 24, 2005

(30) Foreign Application Priority Data
May 5, 2004 (DE) .......................... 10 2004 022 057

(51) Int. Cl.
G06F 15/16 (2006.01)
(52) U.S. Cl.
USPC .......................................... 709/227; 709/205
(58) Field of Classification Search
CPC .................................. H04L 12/2602
USPC ................................. 709/205, 227
See application file for complete search history.

(56) References Cited

U.S. PATENT DOCUMENTS

| 5,341,426 A * | 8/1994 | Barney et al. ................. 713/171 |
| 5,671,353 A * | 9/1997 | Tian et al. ........................ 714/48 |
| 5,835,735 A * | 11/1998 | Mason et al. ................. 710/107 |
| 7,415,505 B2 * | 8/2008 | Wang et al. .................... 709/207 |
| 2002/0083377 A1 * | 6/2002 | Clauss et al. ..................... 714/57 |
| 2002/0087359 A1 * | 7/2002 | Bocionek .......................... 705/2 |
| 2002/0165968 A1 * | 11/2002 | Cosentino .................... 709/227 |
| 2005/0053091 A1 * | 3/2005 | Lee ............................... 370/466 |
| 2005/0086336 A1 * | 4/2005 | Haber .......................... 709/223 |
| 2006/0155577 A1 * | 7/2006 | Niemeyer ........................ 705/2 |
| 2006/0212814 A1 * | 9/2006 | Campbell et al. ............. 715/733 |
| 2006/0235549 A1 * | 10/2006 | Hearn et al. .................... 700/90 |
| 2007/0032917 A1 * | 2/2007 | Behr ................................. 701/1 |

OTHER PUBLICATIONS

Microsoft. "How to configure and use Automatic Updates in Windows XP". Article ID 306525. Jul. 14, 2004.*

* cited by examiner

Primary Examiner — Bryan Lee
(74) Attorney, Agent, or Firm — Harness, Dickey & Pierce, P.L.C.

(57) ABSTRACT

A method and an apparatus are for monitoring the transmission of medical data in a communication network, in particular in an image communication network, with technical modalities for the recording of the medical data and data processing units being connected to one other via the communication network as network subscribers. The method includes checking at least one of data and parameters to be transmitted between the network subscribers, for compatibility.

25 Claims, 1 Drawing Sheet

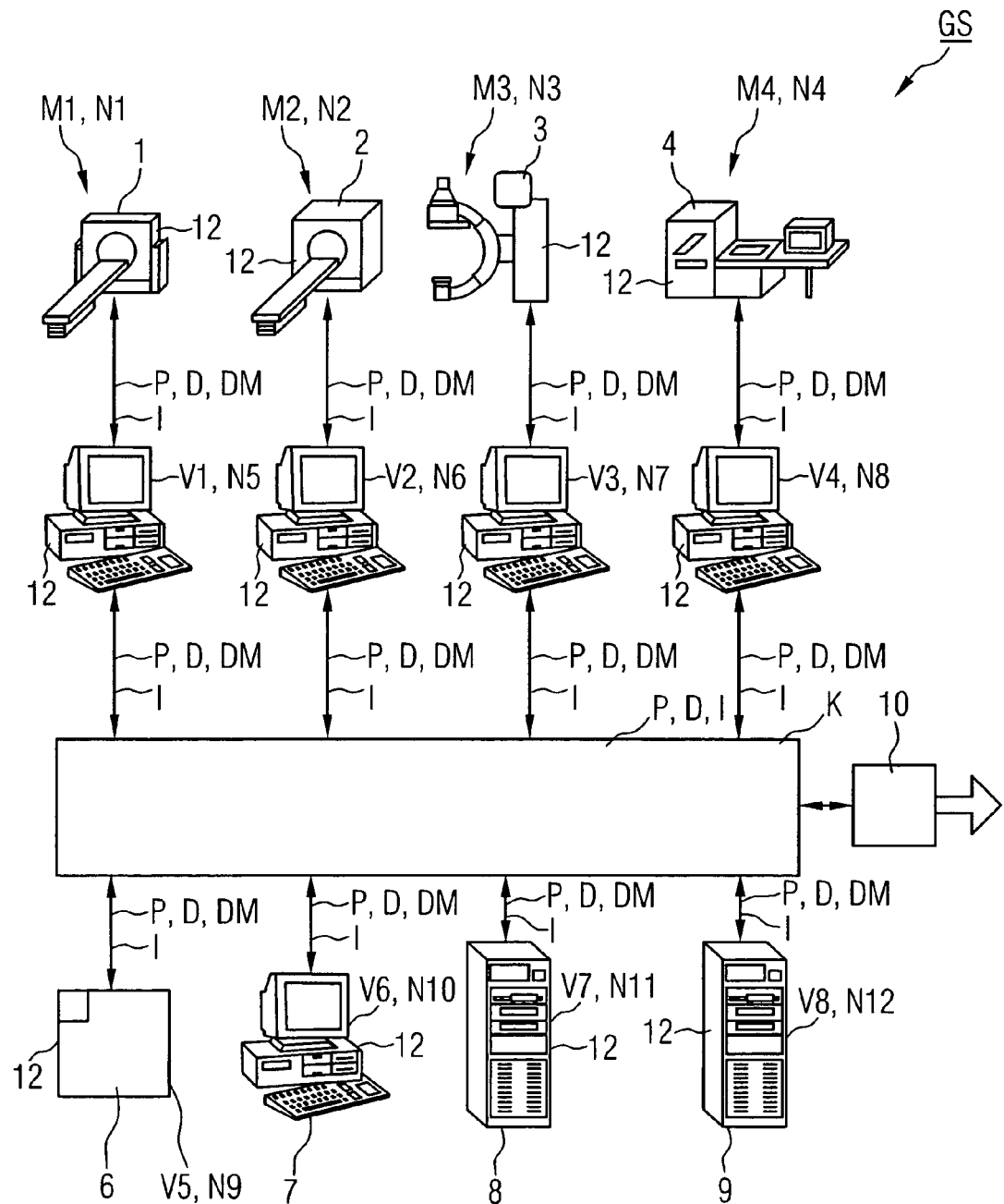

METHOD AND APPARATUS FOR MONITORING THE TRANSMISSION OF MEDICAL DATA IN A COMMUNICATION NETWORK

The present application hereby claims priority under 35 U.S.C. §119 on German patent application number DE 10 2004 022 057.3 filed May 5, 2004, the entire contents of which is hereby incorporated herein by reference.

FIELD OF THE INVENTION

The invention generally relates to a method and/or an apparatus for monitoring the transmission of medical data. For example, such data may be examination image data. This may further be done in a communication network, in particular in an image communication network, with two or more technical modalities, for example technical diagnosis appliances. This may be done to record the medical data and may include two or more data processing units for local processing, issuing and storage of the image data, for example a work station or an archive memory being connected to one another as network subscribers via the communication network.

BACKGROUND

In general, an image communication network has two or more so-called "modalities". The expression "modality" in this case refers to a recording unit, for example an X-ray unit, a computer tomography scanner, etc. for recording data, such as examination image data. Such a unit may include a data processing unit for processing and local storage, for a limited time, of the data, that is to say of the examination image data.

For data interchange, the modalities and data processing units may be connected to one another via a data transmission unit, for example a data bus system or a communication network, the so-called image communication network based on the DICOM standard (DICOM=Digital Imaging and Communications in Medicine). The DICOM Standard is an industry standard for the transmission of images and other medical information between computers (=data processing units) to allow the digital communication between recording and diagnosis appliances of different manufacturers.

In branching or networked systems having two or more modalities, it may be necessary to interchange data and/or parameters, in particular image data, operating and/or system parameters, between two or more modalities or imaging medical systems, in particular in order to jointly use or to distribute the data and/or parameters. In this case, the data is interchanged between the various modalities throughout the system.

Since DICOM allows innumerable transmission methods, and the DICOM Standard allows interpretation freedom for the implementation of transmission protocols and data representations, it is possible, despite the use of the DICOM Standard, for so-called connectivity or inter-operability problems to occur (connectivity describes a data link in terms of the transmission capability, data such as image data, patient data etc. being transmitted completely and without being changed, and "inter-operability" describes the compatibility of two applications in two different network subscribers which allow corresponding interpretation of the same data). Even when comparing so-called "DICOM Conformance Statements" of two appliances or modalities (=specification comparison, as to how an appliance implements the DICOM Standard), it is impossible to ensure that the functions or applications will run completely and reliably on the basis of transmitted or interchanged data. In particular, different data and/or parameters, that is to say data and/or parameters with different formats, in particular different types of user data, in particular image data, different operating, communication and/or system parameters, may lead to incompatibilities in data transmission and in data interchange between the individual modalities and data processing units. This may thus necessitate extensive system consultations, reformatting and/or servicing actions in situ.

SUMMARY OF THE INVENTION

An embodiment of the invention includes an object of specifying a method for monitoring the transmission of medical data in a communication network, which includes two or more imaging modalities, with one aim being to allow sufficiently simple and reliable data interchange. A further aim may be to specify a particularly simple apparatus for monitoring the transmission of medical data.

An embodiment of the invention may be based on the idea that, at least before interchanging data between two or more network subscribers, for example modalities and/or data processing units, the data and/or parameters to be transmitted between the network subscribers, for example image data, operating parameters, system parameters, bus parameters, should be checked at the transmission and/or reception end in a communication network. For this purpose, an embodiment provides for a method for monitoring the transmission of medical data in a communication network, in particular in an image communication network, two or more technical modalities for the recording of medical data, in particular of image data, and data processing units for processing and storage of the data, be connected to one another via the communication network as network subscribers. The data and/or parameters to be transmitted between the network subscribers may be checked for compatibility. Instead of checking the data and/or parameters itself or themselves, it is also possible to use one or more patterns of the data and/or parameters for compatibility checking.

For a compatibility check which is as simple and reliable as possible, the data, parameters and/or the pattern or patterns is or are checked on the basis of a self test. The self test is expediently started and carried out manually, for example by a user, automatically, for example cyclically, or on an event-controlled basis, for example on restarting one of the modalities. In one possible embodiment, the self test is started whenever a network subscriber is newly integrated in the communication network. In this case, the self test is started via this network subscriber to be newly integrated itself, with the self test being carried out in particular for those data links to other network subscribers which are associated with the network subscriber to be newly integrated.

Alternatively or additionally, the self test is carried out when a software update is being carried out on one of the network subscribers, that is to say when the data and/or parameters for a data link associated with this network subscriber to other network subscribers changes or change. Furthermore, the self test is carried out individually for a single data link between a pair of network subscribers and the data, parameters and/or patterns to be transmitted in this case.

The data, parameters and/or patterns for checking compatibility are preferably sent from the relevant network subscriber, for example a modality to be newly integrated or a data processing unit which has just been provided with a software update, to the other network subscribers which are communicating with this relevant subscriber, and are received again by it. In other words, depending on the data link and configuration of the communication network, each network subscriber is designed to carry out the self test in one of the applications mentioned above.

The self test can also be started manually by a user on a relevant network subscriber. This is the case, for example, when the servicing technician who is installing a software update on one of the network subscribers starts the self test on this network subscriber in order to check the data links between this network subscriber and the other network subscribers. Alternatively or additionally, a central data processing unit, for example a workstation for system management, can be designed to carry out the compatibility check by means of a self test.

Depending on the requirement, the self test may be carried out, in particular, for only a single data link or for the respective data link between two or more network subscribers by the representative data, parameters and/or patterns being sent and received again on the relevant data link.

In one simple embodiment of the self test, the data, parameters and/or patterns which is or are sent and received again are compared with one another. In this case, the comparison is advantageously used to generate a message, which is classified with regard to the compatibility check or constructed hierarchically, in particular an information message, a service message, an archive message and/or an error message. In this case, the individual messages are checked on the basis of various criteria.

For example, in a first level of the message, an information message is generated on the basis of the result of the self-test, in particular if the data, parameters and/or patterns which is or are sent and received again for an individual data link and/or for the respective data link are the same. The identical nature of the data indicates 100% connectivity of the two appliances, and this is output to the user. If the connectivity is less than this, information about those DICOM attributes, image data or image types which cannot be transmitted from one appliance to another (=cannot be communicated 1:1) is output as an information message.

In addition, an appropriate information message is output to the user at a predetermined limit value for the connectivity and its non-compliance. For example, an information message is output when the self test identifies that a determined limit value for the connectivity has been exceeded, that is to say a specific number of transmitted data items, such as image types or attributes, do not match between two appliances.

Furthermore, in a first level of the message, an error message can be generated if the data, parameters and/or patterns which is or are sent and received again for an individual data link and/or for the respective data link are not the same. The data, parameters and/or patterns which are sent and received again are not the same, for example, when the data, parameters and/or patterns are only sent but are not received (=transmission error and loss of data) or when the data, parameters and/or patterns are sent but are received again incorrectly (=change to the data, parameters and/or patterns during transmission). The error message is produced during or after the data transmission. In other words, the self test checks the respective data link between two network subscribers for connectivity and interoperability. Connectivity is a precondition for interoperability between two network subscribers or applications.

Furthermore, in a second level of the message, an extended or qualified service message is generated for one or more data links between two or more network subscribers. In particular, the extended service message is generated when the self test identifies non-interoperability, or non-connectivity between two network subscribers and their applications or services. In other words, in a situation where an error in the data link, in particular non-interoperability and/or non-connectivity in the data link between two or more network subscribers, is identified in the first level on the basis of the self test, the extended service message can be generated in the second level. For example, the service message which is more comprehensive than the general information message in terms of the details about the connectivity and inter-operability is used to inform a servicing technician or some other specialist in data communication.

The message in the first and/or second level is preferably sent to a control center, for example to system management or to a service and monitoring control center. Furthermore, the message, for example the information message and/or the extended service message, can be sent to a service center in a higher-level network, for example in a hospital network which has a number of image communication networks. This service message is used as the basis for system changes, for example software updates, parameter changes, or else for recommendations, derived from the message, for the customer or user of the appliance.

Additionally or alternatively, in a third level of the message, an archive message is generated by way of the network subscriber carrying out the self test. In this case, the archive message is produced after the self test on the basis of the result, and is stored in the associated appliance or in the associated modality. In particular, the archive message is used for future data transmission or communication, in order to assess the success of future data transmissions and, if appropriate, to output a warning message.

For this purpose, when a new data link is set up for data, parameters and/or patterns to be newly transmitted, the result of the previous self test for this data, parameters and/or patterns is checked for a relevant data link and the associated data, parameters and/or patterns to be transmitted, on the basis of the archive message, for the presence of an information message or error message. Further, a warning message is generated if an information message or error message is present.

Thus, a warning message is output to the user before the actual data transmission, to be precise whenever, based on the results of the self test which are stored in the archive message, a previous data transmission was not successful or was possible only to a restricted extent. This ensures that, if a data link between two or more network subscribers is faulty and another connection is set up or another data link is formed between them, loss of data or an incorrect transmission is avoided not only by outputting a warning message but, if appropriate, also by suppressing the interchange of data until the data link is fully operational again in terms of connectivity and interoperability.

With regard to the apparatus for monitoring the transmission of medical data in the communication network, a monitoring module is advantageously provided in order to check the compatibility of data, parameters and/or patterns to be transmitted between the network subscribers. Depending on the nature and configuration of the apparatus, the monitoring module may be integrated in one of the network subscribers or in two or more network subscribers. In particular, the monitoring module is in the form of a software module.

The advantages achieved by at least one embodiment of the invention may be, in particular, that a data link which has been set up between two or more network subscribers is checked automatically or manually, for data compatibility, on the basis of a self test, for example on reintegration of a network subscriber or in the event of a software update on one of the network subscribers. In this case, the self test is not just restricted to individual data items and/or parameters and/or patterns. In fact, the self test is carried out in order to check for complete connectivity and interoperability.

Furthermore, a hierarchically classified message is generated as the result of the self test and is configured in an entirely general form for a user of one of the network subscribers and/or specifically and thus more comprehensively for a servicing technician. Furthermore, the self test of this system ensures that all incompatibilities of one or more data links between two or more network subscribers are identified. If appropriate, a data link which has been identified as being faulty can be inhibited for further data interchange, in order to avoid loss of data.

BRIEF DESCRIPTION OF THE DRAWINGS

Example embodiments of the invention will be explained in more detail with reference to the drawing, which should not be understood as restrictive.

The FIGURE schematically shows one possible embodiment of a medical appliance system having two or more network subscribers which are connected via a data transmission unit or a communication network, in particular an image communication network.

DETAILED DESCRIPTION OF THE EXAMPLE EMBODIMENTS

As the network subscribers N1 to N12, the medical appliance system GS includes a number of modalities M1 to M4 for recording data D, for example medical images, and a number of data processing units V1 to V8 for processing and storage of the data D. The modalities M1 to M4 are, for example, imaging appliances. For example, they may include a CT scanner 1 for computed tomography, a magnetic resonance imaging scanner 2, a digital subtraction angiography unit 3 and an X-ray unit 4 for digital radiography. The respective modality M1 to M4 in this embodiment includes an associated data processing unit V1 to V4 for local processing and storage of the data. A computer or a workstation may be used, for example, as the data processing unit V1 to V4, by which the recorded data D can be processed and stored locally, in particular for a limited time. Patient data associated with the data D can also be entered.

The modalities M1 to M4 and their respectively associated apparatus V1 to V5 are connected to one another via the communication network K. The communication network K is, for example, in the form of a data bus system or a network.

Further data processing units V5 to V8, for example a central image storage and image archiving unit 6, a central archive memory 7 as a findings console with a local image store and/or further workstations 8 or servers 9 which are used as patient data servers or program servers, can be connected to the communication network K, for central processing and archiving of the data D.

The images and data are in this case interchanged via the communication network K in accordance with the so-called DICOM Standard, an industry standard for the transmission of images and data between modalities M1 to M4, that is to say medical diagnosis appliances from different manufacturers, or for different applications and services of other modalities M1 to M4 or other data processing units V1 to V8.

Furthermore, a network interface 10, for example a modem or a radio interface, may be connected to the communication network K, via which the communication network K is connected to a global data network, for example to the Internet or World Wide Web, or to a higher-level network, for example a hospital network.

A monitoring module 12 may be provided in order to check the compatibility of data D and/or parameters P to be transmitted between the network subscribers N1 to N12, that is to say the modalities M1 to M4 and/or the other data processing units V1 to V8. Depending on the nature and configuration of the medical appliance system GS, the monitoring module 12 may be implemented as an integrated module on one or all of the network subscribers N1 to N12, for example on one of the modalities M1 to M4 or on two or more modalities M1 to M4, and/or on the other data processing units V1 to V8, the central image storage and image archiving unit 6, the central archive memory 7 and/or the workstation 8 and/or the server 9.

During operation of the medical appliance system GS, the data D and/or the parameters P to be transmitted between the network subscribers N1 to N12 is/are checked for compatibility by way of the monitoring module 12. In this case, the compatibility check is carried out on the basis of a self test. Depending on the nature and configuration of the compatibility check, the self test is started manually, automatically or on an event-controlled basis.

For example, the self test can be started manually by a user of one of the network subscribers N1 to N12. Alternatively or additionally, the self test can be started automatically by the medical appliance system GS, for example cyclically, or can be started on an event-controlled basis, for example on restarting one of the network subscribers N1 to N12. The self test is preferably started when a network subscriber N1 to N12 has to be newly integrated in the communication network K and/or in the event of a software update to one of the network subscribers N1 to N12.

During the self test, the data D and/or parameters P are sent to the other network subscribers N1 to N12 which are communicating with it, and are received again from it—the relevant network subscriber N1 to N12—in order to check the compatibility of the relevant network subscriber N1 to N12, for example a network subscriber to be newly integrated. As an alternative to the sending of the data D and/or of the parameters P itself or themselves, a pattern DM of the data D and/or of the parameters P can also be used for the self test of the relevant network subscribers N1 to N12.

Depending on the scope of the self test, for example just a check of a single data link, of two or more data links or of all the data links, only the data D, parameters P and/or patterns DM which represents or represent a respective data link between two or more network subscribers N1 to N12 will be sent and received again. The data D, parameters P and/or patterns DM which is or are sent and received again is or are then compared with one another by use of the activated monitoring module 12 for the relevant network subscriber N1 to N12. On the basis of the comparison, a message I which is hierarchical or is classified on the basis of the compatibility check is generated, for example an information message, a service message, an archive message and/or an error message.

The expression a hierarchically classified message I refers to information which differs on the basis of the scope, nature and/or priority and is sent on the one hand to a user and on the other hand to a servicing technician. For example, in a first level of the message I, an information message may be generated if the data D, parameters P and/or patterns DM which is or are sent and received again for an individual data link and/or for the respective data link are the same. Furthermore, in the first level of the message I, an error message can be generated if the data D, parameters P and/or patterns DM which is or are sent and received again for an individual data link and/or for the respective data link are not the same.

The data D, parameters P and/or patterns DM which are sent and received again are not the same as one another when, for example, they are sent but not received again, or when they are sent but are received again incorrectly, incompletely or in a different form or differently. The self test thus checks the respective data link between two network subscribers N1 to N12 and their applications and services for interoperability and connectivity. If, by way of example, the self test identifies non-interoperability and/or non-connectivity between two network subscribers N1 to N12 and/or their applications and services, then the message I can be used to initiate or carry out measures, for example changes to settings and/or parameters P on the appliances and/or the applications and/or the services.

In a second level, an extended service message is generated for a comprehensive message I, which is used for serving the data link. Furthermore, in a third level of the message I, for a message I which monitors the current status of the data link, an archive message can be stored by the network subscriber N1 to N12 carrying out the self test. In this case, a warning message can be generated on the basis of the archive message for, for example, a data link which has been identified as being faulty in the self test, when setting up another data link for a subsequent data interchange. Alternatively, the warning message can be used to suppress the interchange of data until a fault-free data link is identified on the basis of the self test of the monitoring module 12.

Furthermore, other levels are possible for a message I. The nature and the configuration of the respective message I is in this case governed by the function and the requirement for the relevant data link to be monitored. In particular, the message I can be sent to a higher-level network, for example a service center in a higher level network, for example in a hospital network, and further measures can be initiated or carried out in order to overcome possible incompatibilities by changing sets and/or parameters P, for example system parameters or communication parameters, at the relevant network subscribers N1 to N12.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for monitoring the transmission of medical data in an image communication network based on the Digital Imaging and Communications in Medicine (DICOM) standard, comprising:

connecting technical modalities, adapted to record the medical data, and data processing units to one other via the communication network as network subscribers;

transmitting a message including data from a first network subscriber, the first network subscriber being a first technical modality, the first technical modality being a first recording unit for medical image data, to at least a second network subscriber, the second network subscriber being a second technical modality, the second technical modality being a second recording unit for medical image data;

receiving, at the first network subscriber, the message including the medical image data from at least the second network subscriber; and checking, by the first network subscriber, the medical image data from at least the second network subscriber for compatibility based on a comparison between the medical image data transmitted from the first network subscriber to at least the second network subscriber, the medical image data being checked for compatibility based on a self test and the medical image data received by the first network subscriber from at least the second network subscriber, the compatibility check including checking the medical image data from at least the second network subscriber for the presence of at least one pattern representative of the medical image data transmitted from the first network subscriber, wherein a comparison is used to generate another message, classified with regard to the compatibility check, and wherein, in a second level of the another message, an extended service message is generated for one or more data links between two or more network subscribers.

2. The method as claimed in claim 1, wherein the self test is started at least one of manually, automatically and on an event-controlled basis.

3. The method as claimed in claim 1, wherein the self test is carried out for the first network subscriber to be newly integrated in the communication network, for its associated data links to other network subscribers.

4. The method as claimed in claim 1, wherein the self test is carried out in the event of a change to the data for the first network subscriber, for its associated data link to another network subscriber.

5. The method as claimed in claim 4, wherein, in a first level of the another message, an information message is generated if the data transmitted to and received from the second network subscriber, for at least one of an individual data link and for the respective data link, are the same.

6. The method as claimed in claim 4, wherein, in a first level of the another message, an error message is generated if transmitted to and received from the second network subscriber, for at least one of an individual data link and for the respective data link, are not the same.

7. The method as claimed in claim 4, wherein, in another level of the another message, an archive message is generated by the first network subscriber carrying out the self test.

8. The method as claimed in claim 7, wherein, when a new data link is set up for at least one of data, parameters and at least one pattern to be newly transmitted, the result of the previous self test for the at least one of data, parameters and at least one pattern is checked for a relevant data link and the associated at least one of data, parameters and at least one pattern to be transmitted, on the basis of the archive message, for the presence of an error message, and a warning message is generated if an error message is present.

9. The method as claimed in claim 6, wherein the another message is at least one of an information message, a service message, an archive message and an error message.

10. The method as claimed in claim 1, wherein the self test is carried out individually for a data link between a pair of network subscribers, the pair of network subscribers including the first network subscriber.

11. The method as claimed in claim 1, wherein at least the second network subscriber includes a plurality of network subscribers.

12. The method as claimed in claim 11, wherein only the data which represent a respective data link between two or more network subscribers is transmitted to and received from the second network subscriber.

13. The method as claimed in claim 12, the data which is transmitted to and received from the second network subscriber, are compared with one another.

14. The method as claimed in claim 11, wherein the data which is transmitted to and received from the second network subscriber are compared with one another.

15. The method as claimed in claim 1, wherein the method is for monitoring the transmission of medical data in an image communication network.

16. The method of claim 1, wherein the first network subscriber and at least the second network subscriber are determined to be compatible when the transmitted data and the received data are the same.

17. The method of claim 1, further comprising:
comparing, by the first network subscriber, the transmitted data with the received data to determine whether the transmitted data and the received data are the same; and wherein
the first network subscriber and at least the second network subscriber are determined to be compatible when the transmitted data and the received data are the same.

18. An apparatus for monitoring the transmission of medical data in a communication network based on the Digital Imaging and Communications in Medicine (DICOM) standard, the network including technical modalities configured to record medical data and data processing units connected to one another via the communication network as network subscribers, the apparatus comprising:
a first network subscriber the first network subscriber being a first technical modality, the first technical modality being a first recording unit for medical image data, and configured to,
transmit a message including data to at least a second network subscriber the second network subscriber being a second technical modality, the second technical modality being a second recording unit for medical image data,
receive the message including the medical image data from at least the second network subscriber; and
check the compatibility of the medical image data from at least the second network subscriber based on a comparison between the medical image data transmitted from the first network subscriber to at least the second network subscriber, the medical image data being checked for compatibility based on a self test and the medical image data received by the first network subscriber from at least the second network subscriber, the compatibility check including a check of the medical image data from at least the second network subscriber for the presence of at least one pattern representative of the medical image data transmitted from the first network subscriber,
wherein a comparison is used to generate another message, classified with regard to the compatibility check, and
wherein, in a second level of the another message, an extended service message is generated for one or more data links between two or more network subscribers.

19. The apparatus as claimed in claim 18, wherein a monitoring module is integrated into at least the first network subscriber.

20. The apparatus as claimed in claim 18, wherein the monitoring module is integrated in at least one of the modalities and data processing units.

21. The apparatus as claimed in claim 18, wherein the monitoring module is integrated in at least two of the modalities and data processing units.

22. A method for monitoring the transmission of medical data in a communication network based on the Digital Imaging and Communications in Medicine (DICOM) standard, the communication network including technical modalities, configured to record the medical data, and data processing units, connected to one other via the communication network as network subscribers, the method comprising:
transmitting a message including data from a first network subscriber, the first network subscriber being a first technical modality, the first technical modality being a first recording unit for medical image data, to at least a second network subscriber, the second network subscriber being a second technical modality, the second technical modality being a second recording unit for medical image data;
receiving, at the first network subscriber, the message including the medical image data from at least the second network subscriber; and
checking compatibility of the medical image data from at least the second network subscriber based on a comparison between the medical image data transmitted from the first network subscriber to at least the second network subscriber, being checked for compatibility based on a self test and the medical image data received by the first network subscriber from at least the second network subscriber, the compatibility check including checking the medical image data from at least the second network subscriber for the presence of at least one pattern representative of the medical image data transmitted from the first network subscriber,
wherein a comparison is used to generate another message, classified with regard to the compatibility check, and
wherein, in a second level of the another message, an extended service message is generated for one or more data links between two or more network subscribers.

23. The method as claimed in claim 22, wherein the self test is started at least one of manually, automatically and on an event-controlled basis.

24. The method as claimed in claim 22, wherein the self test is carried out for the first network subscriber to be newly integrated in the communication network, for its associated data links to other network subscribers.

25. A non-transitory computer readable medium, including a computer program that, when executed on a computer, causes the computer to carry out a method for monitoring the transmission of medical data in a communication network based on the Digital Imaging and Communications in Medicine (DICOM) standard, the communication network including technical modalities, configured to record the medical data, and data processing units, connected to one other via the communication network as network subscribers, the method comprising:

transmitting a message including data from a first network subscriber, the first network subscriber being a first technical modality, the first technical modality being a first recording unit for medical image data, to at least a second network subscriber, the second network subscriber being a second technical modality, the second technical modality being a second recording unit for medical image data;

receiving, at the first network subscriber, the message including the medical image data from at least the second network subscriber; and checking compatibility of the medical image data from at least the second network subscriber based on a comparison between the medical image data transmitted from the first network subscriber to at least the second network subscriber, being checked for compatibility based on a self test and the medical image data received by the first network subscriber from at least the second network subscriber, the compatibility check including checking the medical image data from at least the second network subscriber for the presence of at least one pattern representative of the medical image data transmitted from the first network subscriber, wherein a comparison is used to generate another message, classified with regard to the compatibility check, and wherein, in a second level of the another message, an extended service message is generated for one or more data links between two or more network subscribers.

* * * * *